United States Patent Office 3,012,580
Patented Dec. 12, 1961

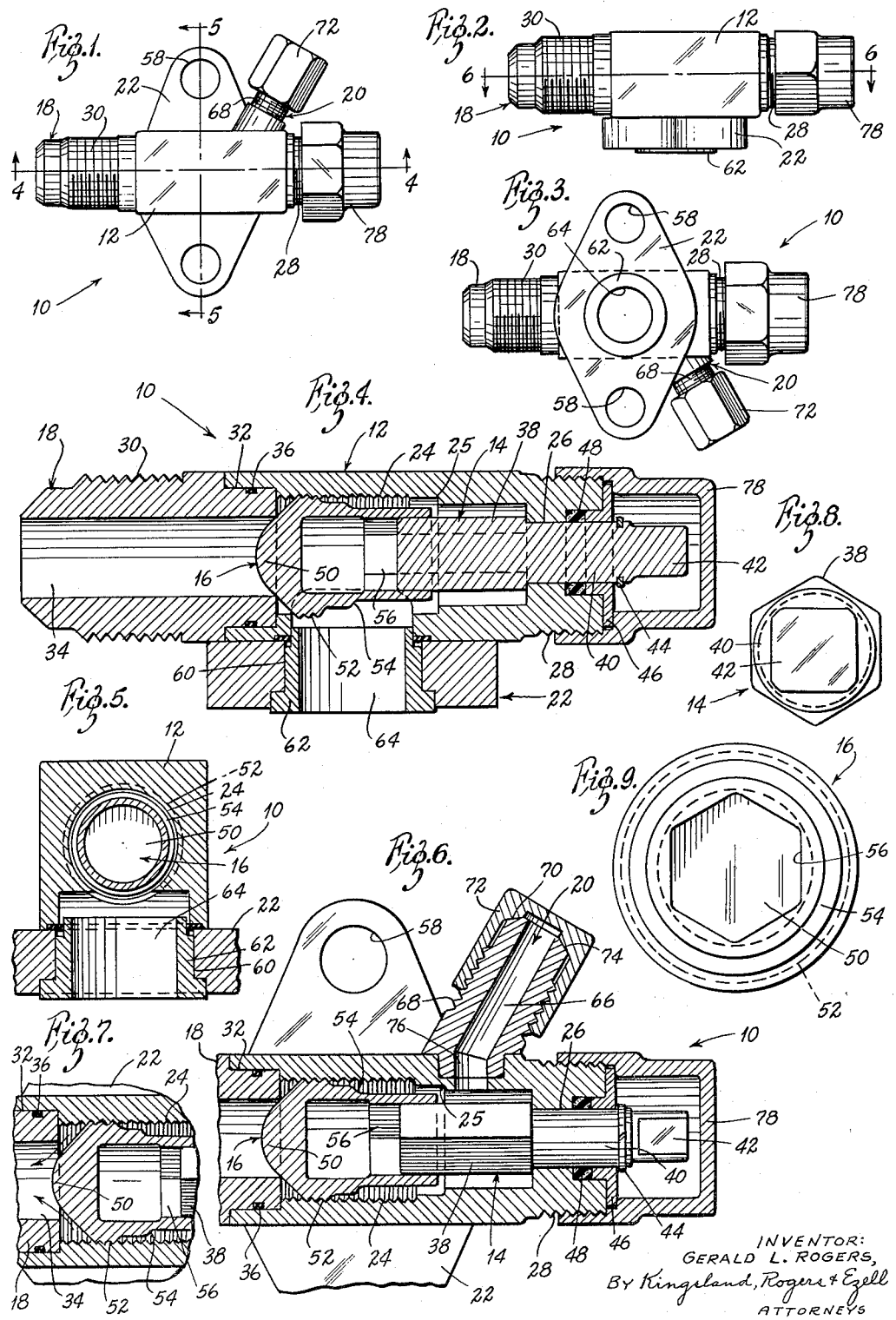

1

3,012,580
SERVICE VALVE
Gerald L. Rogers, Olivette, Mo., assignor to Stile-Craft Manufacturers, St. Louis, Mo., a corporation of Missouri
Filed June 9, 1958, Ser. No. 740,819
2 Claims. (Cl. 137—625.5)

The present invention relates generally to valves, and more particularly to a novel service valve for air conditioning equipment.

In brief, the present novel service valve is telescopic, thereby being much smaller in length than service valves heretofore in use. A preferred embodiment includes a valve body within which are located a rotatable valve stem and telescopically associated rotatable and longitudinally movable valve member. A nose member having a valve seat is mounted on one end of the valve body, the valve member engaging this valve seat to close the Freon gas, or the like, system during filling or adding of Freon gas, or the like. Within the body is a second valve seat engageable by the valve member when the parts are in operating position. Suitable means are provided for introducing gas into the valve and into the gas system. The valve members are so mounted within the body as to provide, in effect, a floating relation to insure perfect seating thereof in both filling and operating positions.

Therefore, an object of the present invention is to provide a novel service valve which is compact in form, primarily in length, thereby eliminating the bulky units presently in use which are difficult to install in the limited space afforded in many refrigeration installations, as in automobiles, and the like.

Another object is to provide a novel service valve incorporating a novel internal arrangement of telescoping valve elements providing positive seating in both filling and operating positions without the requirement of expensive machining and precision fitting of parts.

Another object is to provide a novel service valve which includes novel internal telescoping parts, which materially reduce the overall length of the unit and which provide a more efficient gas control.

Other objects are to provide a novel service valve which is relatively inexpensive in that the necessity for close tolerances is eliminated, which may be readily employed even in close quarters, which requires minimum maintenance, which may be used by operating personnel under simple instructions, and which otherwise fulfills the objects and advantages sought therefor.

The foregoing and other objects and advantages are apparent from the following description taken in conjunction with the accompanying drawing, in which:

FIGURE 1 is a plan view of a service valve for air conditioning equipment incorporating the concepts of the present invention;

FIGURE 2 is a side elevational view thereof, looking upwardly of the sheet toward FIGURE 1;

FIGURE 3 is a bottom plan view thereof;

FIGURE 4 is a longitudinal vertical cross-sectional view on an enlarged scale taken on substantially the line 4—4 of FIGURE 1;

FIGURE 5 is a transverse vertical cross-sectional view on an enlarged scale taken on substantially the line 5—5 of FIGURE 1;

FIGURE 6 is a horizontal cross-sectional view on an enlarged scale taken on substantially the line 6—6 of FIGURE 2, the part being shown in filling operation positions;

FIGURE 7 is a fragmentary view similar to FIGURE 6, showing the valve member in open position;

FIGURE 8 is an enlarged end view of the valve stem; and

2

FIGURE 9 is an end view of the valve member looking towards the open end thereof.

Referring to the drawing more particularly by reference numerals, 10 indicates generally a service valve for air conditioning equipment, and the like, constructed in accordance with the teachings of the present invention. Broadly, the service valve 10 includes a valve body 12, a valve stem 14 rotatably mounted within the valve body 12, a valve member 16 telescopically associated with the valve stem 14 and rotatably and longitudinally movable within the valve body 12, a nose member 18, a filling fitting 20, and a base pad 22.

The valve body 12 is generally tubular in form and includes internal threads 24, an annular shoulder 25, a reduced passage portion 26 near one end, and external threads 28. The nose member 18 is also generally tubular in form and includes external threads 30, a reduced portion 32, and a passage 34. The reduced portion 32 extends within the end of the valve body 12 and is press-fitted therein, being sealed by a solder ring 36.

The valve stem 14 is elongated in form and is of the general configuration clearly shown in FIGURES 4, 6 and 8. The valve stem 14 includes a hexagonal end portion 38, an annular central portion 40, and a square end portion 42. The annular portion 40 is disposed within the reduced passage portion 26 for rotation, being maintained against longitudinal movement by the shoulders of the hexagonal portion 38 at one side of the reduced passage portion 26 and by a ring 44 mounted in a groove in the annular portion 40, which engages a bushing 46 mounted on the annular portion 40 and engaging the end of the valve body 12, as is clear from the drawing. An O-ring 48 seals the juncture between the annular portion 40 and the reduced passage portion 26.

The valve member 16 is of the configuration clearly shown in the drawing and includes a conical head portion 50, annular threads 52, an annular sloping shoulder 54, and an internal chamber section 56 of hexagonal cross section which receives with a loose fit the hexagonal end portion 38 of the valve stem 14. The threads 52 engage the threads 24 and, in order to provide a desirable play between the valve member 16 and the valve body 12, the threads 52 may be No. 1 and the threads 24 No. 2.

The valve body 12 is welded or otherwise mounted upon the base pad 22, the latter being of the form shown in the drawing and including opposed openings 58 for receiving mounting bolts and a central opening 60 which receives a seat 62 of sleeve form defining a gas passage 64. If desired, the base pad 22 may be swivelled to the valve body 12, or replaced by a threaded fitting, or the like.

The filling fitting 20 is press-fitted into the side of the valve body 12, as is clearly shown in FIGURE 6, and includes a filling passage 66, external threads 68, and an annular seat 70. A cap 72 threadedly engages the threads 68 and includes an annular internal shoulder 74 which seats against the annular seat 70 to seal the passage 66 when the service valve 10 is in operation. The filling passage 66 communicates with a passage 76 leading into the valve body 12 and communicating with the gas passage 64 when the valve member is in the position of FIGURE 4, as is clear therefrom.

A cap 78 engages the threads 28 on the end of the valve body 12 and closes off the end 42 of the valve stem 14 to prevent accidental rotation of the valve stem 14.

In use, when it is desired to fill the gas system of the air conditioning unit with which the service valve 10 is associated, or it becomes necessary to replenish the gas supply, the valve member 16 is moved to the position of FIGURE 4 from the position of engagement with the shoulder 25, which is accomplished by clockwise rotation of the stem member 14 after removal of the closure cap 78. It is manifest from the foregoing and the drawing that clockwise rotation of the valve stem 14 will effect both rotation of the valve member 16 and movement thereof to the left until the conical portion 50 seats firmly against the end of the nose member 18 as a seat. Thereupon, the cap 72 is removed and Freon gas, or the like, is introduced through the filling fitting 20 in the usual manner. After filling the cap 72 is replaced and the valve member 16 moved to the right until the shoulder 54 is in engagement with the edge of the shoulder 25.

The telescopic arrangement of the valve member 16 and the valve stem 14 reduces the overall length of a one-piece rigid valve unit. In addition, the valve member 16, in effect, floats on the end of the valve stem 14 in its engagement with the threads 24 so that it is unnecessary to precision machine the end of the nose member 18 or the conical head portion 50 in order to have a proper sealing relation between the valve member 16 and the end of the nose member 18. The same thing is true in respect to the sealing engagement of the shoulder 54 and the edge of the shoulder 25.

It is apparent from the foregoing that there has been provided a novel service valve which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention, which is limited only by the claims which follow.

What is claimed is:

1. A service valve comprising, in combination, a valve body, opposed valve seats located within said body, and a movable composite valve unit within said body including a valve stem mounted for rotation and against axial movement, and a valve member telescopically engaged by said valve stem for rotation thereby and threadedly mounted in said valve body for axial movement between said opposed valve seats the threads on said valve member being minimal in number and of different size to the threads of the valve body providing a bodily movable relationship of said valve member with said valve body, the telescopic fit between said valve stem and said valve member being predeterminately loose thereby permitting angular axial misalignment therebetween, so that said valve member has a floating relation with said valve stem, said valve member including spaced valve surfaces selectively engageable with said valve seats, said valve seats in said body being spaced apart a predetermined distance such that when the valve portion is in either extreme position of movement with a valve seat engaging surface engaged with a valve seat of the valve body then the free end of the valve portion is disposed between the two seats of the valve body.

2. A service valve comprising, in combination, a valve body, a telescopic valve unit in said valve body including an axially movable valve portion and a telescopically associated non-axially movable valve stem, said valve portion threadedly engaging said valve body, the threads on said valve portion being minimal in number and of different size to the threads of the valve body providing a bodily movable relationship of said valve portion with said valve body, said telescopic relationship of said valve portion being predeterminately loose providing axial misalignment of said valve portion relative to said valve stem, and spaced valve seats in said valve body, said valve portion having spaced valve seat engaging surfaces for alternate respective engagement with said valve seats, said valve seats in said body being spaced apart a predetermined distance such that when the valve portion is in either extreme position of movement with a valve seat engaging surface engaged with a valve seat of the valve body then the free end of the valve portion is disposed between the two seats of the valve body, said angular movement between said valve portion and said valve stem and said bodily movable relationship between said valve portion and said valve body allowing ready secure seating of said valve seat engaging surfaces with said valve seats.

References Cited in the file of this patent

UNITED STATES PATENTS

| 250,897 | Descours | Dec. 13, 1881 |
| 1,683,153 | Bishop | Sept. 4, 1928 |
| 1,683,154 | Bishop | Sept. 4, 1928 |
| 2,006,712 | Forbes et al. | July 2, 1935 |
| 2,186,923 | Hopper et al. | Jan. 9, 1940 |
| 2,840,110 | Parsons | June 24, 1958 |

FOREIGN PATENTS

| 897 | Great Britain | Mar. 12, 1874 |
| 640,464 | France | Mar. 26, 1928 |